(12) United States Patent
Basu et al.

(10) Patent No.: US 10,510,339 B2
(45) Date of Patent: Dec. 17, 2019

(54) SELECTING MEDIA USING WEIGHTED KEY WORDS

(71) Applicant: Unnanu LLC, Austin, TX (US)

(72) Inventors: Madhusudhan R. Basu, Austin, TX (US); Matthew G. Brinkley, Wimberley, TX (US); Kalith G. Kumasaru, Matara (LK)

(73) Assignee: Unnanu, LLC, Austin, TX (US)

( * ) Notice: Subject to any disclaimer, the term of this patent is extended or adjusted under 35 U.S.C. 154(b) by 144 days.

(21) Appl. No.: 15/805,018

(22) Filed: Nov. 6, 2017

(65) Prior Publication Data

US 2018/0130461 A1 May 10, 2018

Related U.S. Application Data

(60) Provisional application No. 62/497,076, filed on Nov. 7, 2016.

(51) Int. Cl.
| | |
|---|---|
| *G06K 9/00* | (2006.01) |
| *G10L 15/25* | (2013.01) |
| *G10L 15/26* | (2006.01) |
| *G10L 15/08* | (2006.01) |
| *G10L 21/10* | (2013.01) |
| *G06K 9/46* | (2006.01) |

(52) U.S. Cl.
CPC .......... *G10L 15/08* (2013.01); *G06K 9/00268* (2013.01); *G06K 9/00302* (2013.01); *G06K 9/00718* (2013.01); *G06K 9/4676* (2013.01); *G10L 15/25* (2013.01); *G10L 15/26* (2013.01); *G10L 15/265* (2013.01); *G10L 21/10* (2013.01); *G10L 2015/088* (2013.01)

(58) Field of Classification Search
CPC ...... G06K 9/00302; G10L 15/26; G10L 15/25
See application file for complete search history.

(56) References Cited

U.S. PATENT DOCUMENTS

| | | | |
|---|---|---|---|
| 6,795,808 B1 | 9/2004 | Strubbe et al. | |
| 7,577,246 B2 | 8/2009 | Idan et al. | |
| 8,204,884 B2 | 6/2012 | Freedman et al. | |
| 2004/0210159 A1* | 10/2004 | Kibar | A61B 5/4803 600/558 |
| 2005/0229107 A1* | 10/2005 | Hull | G06F 17/212 715/764 |
| 2012/0262296 A1 | 10/2012 | Bezar | |
| 2013/0290207 A1* | 10/2013 | Bonmassar | G06Q 10/06 705/321 |
| 2014/0376785 A1 | 12/2014 | Bathiche et al. | |
| 2015/0255066 A1* | 9/2015 | Wilder | G06K 9/00744 704/235 |

(Continued)

*Primary Examiner* — Bryan A Blankenagel
(74) *Attorney, Agent, or Firm* — Winstead, P.C.

(57) ABSTRACT

Techniques are disclosed relating to selecting and/or ranking from among multiple recordings based on determining facial attributes associated with detected words. For example, each recording may be transcribed and analyzed to determine whether the recordings include words in one or more sets of words. Facial analysis may be performed during intervals in the recordings corresponding to recognized words. Counts of the recognized words may be weighted based on detected facial attributes. In various embodiments, disclosed techniques may facilitate accurate selection of relevant media from large data sets.

20 Claims, 6 Drawing Sheets

(56) References Cited

U.S. PATENT DOCUMENTS

| | | | |
|---|---|---|---|
| 2015/0324352 A1* | 11/2015 | Meyer | G06F 3/011 |
| | | | 382/103 |
| 2016/0133274 A1* | 5/2016 | Conway | G06K 9/00302 |
| | | | 704/246 |
| 2017/0039869 A1 | 2/2017 | Gleim et al. | |
| 2017/0344532 A1* | 11/2017 | Zhou | G06F 17/2881 |
| 2017/0364741 A1* | 12/2017 | Hau | A61B 5/0077 |
| 2018/0077095 A1* | 3/2018 | Deyle | H04L 51/10 |

* cited by examiner

Table 1
Set of words A:

| Java |
|------|
| JSP |
| SOAP |

Table 2
Statistics for set A:

| Recording | Recognized Words | Count for set A | Percentage for set A |
|---|---|---|---|
| 1 | 8 | 4 | 50 |
| 2 | 3 | 3 | 100 |
| 3 | 4 | 3 | 75 |
| 4 | 6 | 4 | 67 |

Table 3
Attributes for set A:

| Recording | Identified Attributes | Most Common Attribute for Set A | Percentage for most common attribute |
|---|---|---|---|
| 1 | 5 | Attribute 1 | 50 |
| 2 | 3 | Attribute 1 | 100 |
| 3 | 4 | Attribute 4 | 75 |
| 4 | 5 | Attribute 3 | 67 |

Table 4
Weighted Counts for set A:

| Recording | Weighted Count for set A |
|---|---|
| 1 | 4.4 |
| 2 | 3.3 |
| 3 | 1.6 |
| 4 | 3.5 |

SELECTING MEDIA USING WEIGHTED KEY WORDS

This application claims the benefit of U.S. Provisional Application No. 62/497,076, filed on Nov. 7, 2016, which is incorporated by reference herein in its entirety.

BACKGROUND

Technical Field

This disclosure relates to techniques for selecting and ranking recording data and, in particular, to selecting media using weighted keywords, where the weighting is based on facial recognition attributes.

Description of the Related Art

The proliferation of media recording and storage devices have resulted in large amounts of media content. Often, it is difficult to select relevant content from large data sets in a timely and power-efficient manner. Further, selected content in traditional systems may not be particularly accurate in certain contexts. It may be desirable to accurately select relevant media from a large data set in various contexts.

BRIEF DESCRIPTION OF THE DRAWINGS

FIG. 3 is a diagram illustrating exemplary data sets for an exemplary set of key and multiple recordings, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Overview of Exemplary System

Figure 1:
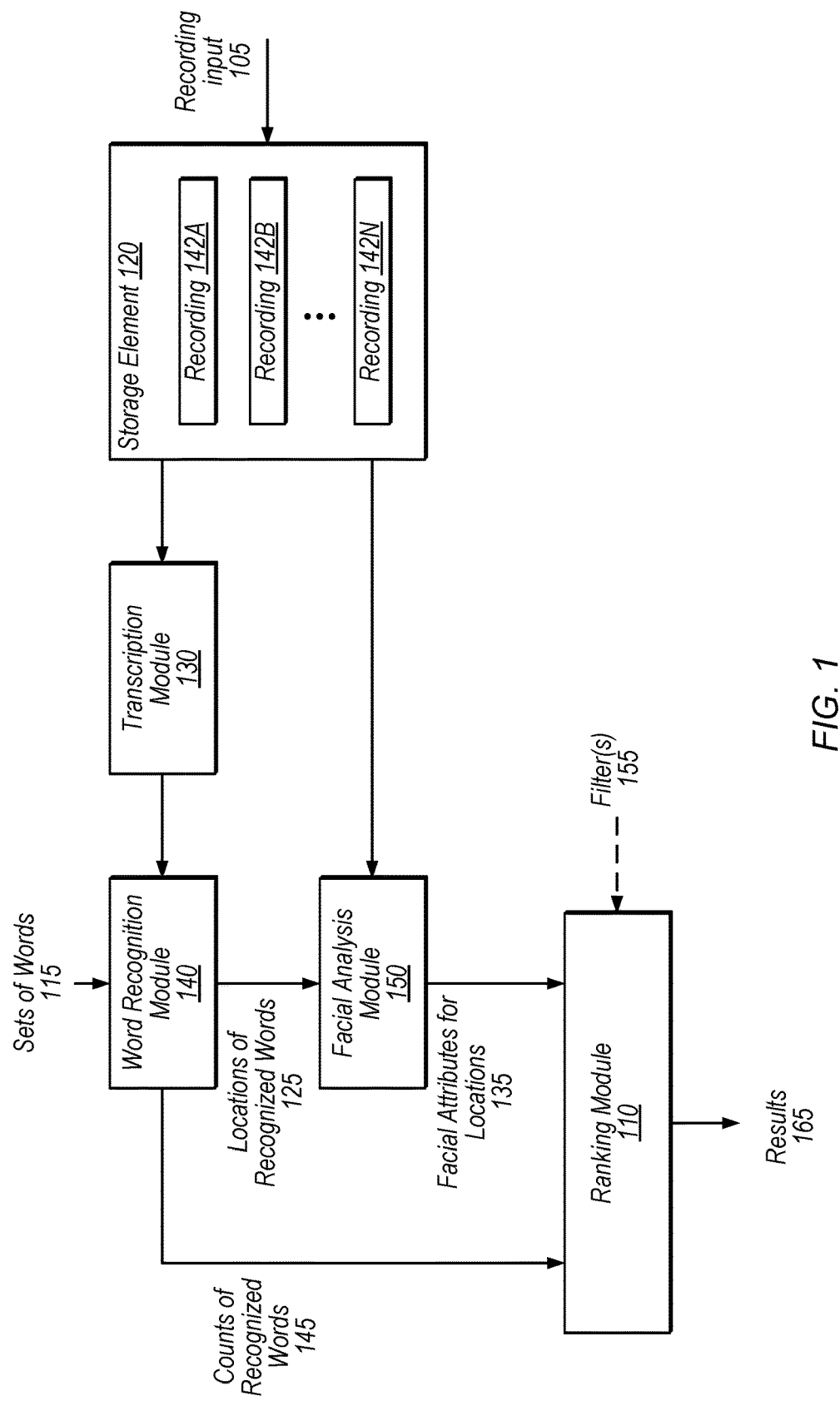
FIG. 1 is a block diagram illustrating an exemplary system for processing audio and video recordings, according to some embodiments.

FIG. 1 is a block diagram illustrating an exemplary system for selecting ranking media based on weighted keywords and facial analysis. In the illustrated embodiment, the system includes ranking module 110, storage element 120, transcription module 130, word recognition module 140, and facial analysis module 150. In various embodiments, the system is configured to transcribe recordings, count recognized words from the transcriptions, perform facial analysis at locations of recognized words, weight the counting results based on corresponding facial recognition attributes, and select recordings based on weighted results (the selecting may include selecting a subset of recordings, ranking recordings, etc.).

Storage element 120, in the illustrated embodiment, is configured to store recordings 142A-142N. In some embodiments, the recordings include audio and video information. Recording input 105 may provide recordings for storage in element 120. Recordings may be generated by the system or received from other devices, e.g., via a network. In various embodiments, the system may process recordings to determine their attributes periodically, upon uploading of a new recording, upon receipt of query information (e.g., search filters), etc.

Transcription module 130, in the illustrated embodiment, is configured to transcribe audio from one or more stored recordings to generate a transcription output. In some embodiments, the transcription output may indicate words recognized in the recordings and the time at which each transcribed word was spoken in the recording.

Word recognition module 140, in the illustrated embodiment, is configured to recognize words in a set of words 115. In some embodiments, multiple words are provided and word recognition module 140 is configured to count occurrences of each word. In some embodiments, multiple sets of words are provided and word recognition module 140 is configured to a count for each set that indicates the overall number of occurrences of words included in the set. For example, if a set of words included both "Java" and "SOAP" and Java was said four times and SOAP was said three times, the count for the set would be seven, in these embodiments. In the illustrated embodiment, module 140 sends information 125 to facial analysis module 150 to indicate the locations of one or more recognized words and information 145 to ranking module 110 to indicate counts of the one or more recognized words.

Facial analysis module 150, in the illustrated embodiment, is configured to perform facial analysis for intervals of a recording corresponding to a recognized word. For example, if the word "Java" is spoken 3 minutes and 35 seconds (3:35) into a recording, module 150 may perform facial analysis on video content from 3:32 to 3:38 to determine facial attributes. The facial attributes may include, for example, the identity of the speaker, truthfulness, attentiveness, happiness, anger, fear, posture, relaxation, etc. The determined facial attributes 135 are output to ranking module 110, in the illustrated embodiment. Facial analysis module 150 may be configured to store known results of processing video data with certain attributes (e.g., facial expressions), e.g., output vectors and compare vectors from analyzed recordings with the known results to determine whether various attributes are present.

Figure 2:
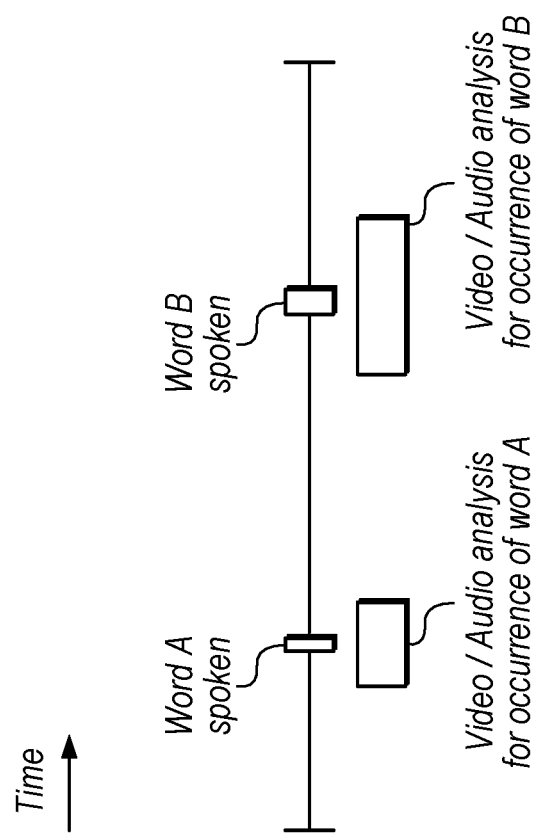
FIG. 2 is a diagram illustrating exemplary processing intervals for determining facial recognition attributes corresponding to detected key words, according to some embodiments.

Turning briefly to FIG. 2, a timing diagram for analysis of an exemplary recording is shown, according to some embodiments. In the illustrated embodiment, word A is spoken earlier in a recording than word B. Word A is also spoken over a shorter interval than interval B (e.g., word B may be a longer word or spoken by a slower speaker). In the illustrated embodiment, video and/or audio analysis is performed for time intervals corresponding to utterance of each word. The time intervals may be the same for each word of may be varied. For example, the time interval considered may vary based on the word, type of word, time taken to speak the word, number of times the word is spoken in the recording, attributes of the speaker, etc.

Turning back to FIG. 1, ranking module 110, in the illustrated embodiment, is configured to select results 165 based on information 135 and 145. In some embodiments, module 110 is configured to rank recordings. In some embodiments, module 110 is configured to rank entities associated with the recordings. For example, module 110 may rank job candidates who have uploaded recordings. In some embodiments, the selection is based in part on one or more filters 155. For example, certain key words may be used as filters if a searcher is most interested in a subset of the words in sets of words 115. In other embodiments, sets of words 115 are determined directly based on a filter 155. Any of various additional filters may be implemented, such as based on age of recordings, recording length, recording quality, other attributes of an entity associated with a recording, etc. In some embodiments, ranking module 110 is configured to operate in at least one non-filtered mode in which it is configured to provide results 165 without considering filter information.

Results 165 may include various types of data. For example, results 165 may included selected and/or ranked entities, selected and/or ranked recordings, information about entities or recordings, etc.

In some embodiments, ranking module 110 is configured to consider other inputs in addition to the illustrated information 135 and 145. For example, ranking module 110 may receive information based on analysis of an overall recording (in contrast to the portions corresponding to recognized words that are analyzed by module 150) and select results 165 based on this additional information. Examples of such overall analysis may include emotion analysis, language style analysis, social tenancy analysis, etc. These types of analysis may be based on audio and/or video.

Consider, for example, one exemplary practical implementation of the system of FIG. 1 in which recordings 142 are generated by job candidates and a potential employer would like to view recordings for the most relevant candidates. In this example, sets of words 115 may be generated based on necessary skills for a job posting. For example, one set of words relating to a job posting that involves Java might include words like "Java," "JSP," and "SOAP." Another set of words relating to circuit simulation might include words like "CAD," "VLSI," "SPICE," etc. A given candidate might say words in the Java set eight times in a given recording. Each occurrence may be analyzed for facial attributes by module 150. The recording may be classified as more or less relevant depending on the count, after weighting the count based on the facial attributes. For example, if the candidate appears unconfident or fearful when using these words, then the recording may not be particularly relevant. On the other hand, if the candidate appears excited and truthful when using these words, the recording may be highly relevant. Regarding the discussion above of overall attributes for a recording, these may be considered in conjunction with the weighted counting of FIG. 1. For example, a given candidate's overall use of language may be factored into the ranking of that candidate and/or a given recording for that candidate.

In various embodiments, ranking module 110 is configured to weight the counts of recognized words based on the facial attribute information 135. The weighting may be performed on a per-count basis (e.g., an angry utterance of a word may be counted as 0.5 while a confident utterance counted as 1.1) or as an adjustment to an aggregate count (e.g., by adjusting the overall count based on one or more determined facial attributes such that a video in which a word was said 8 times might receive a weighted count of only 5.3). In some embodiments, weighting based on attribute information 135 may include negative weights for certain attributes. E.g., an occurrence of a word may be assigned a negative count such as −0.3 or −2 when certain attributes such as untruthfulness are detected. In some embodiments, recordings that do not meet a threshold weighted count are not included in results 165.

The system of FIG. 1 is configured to generate results 165 periodically, in some embodiments. In other embodiments, the system may generate results 165 in response to a user query, e.g., that specifies one or more filters 155. In some embodiments, the system may process recordings as they are uploaded, e.g., such that modules 130, 140, and 150 have already performed their analysis prior to ranking module 110 being invoked for a given search or period update, for example.

The modules discussed herein are shown for purposes of explanation but are not intended to limit the scope of the disclosure. In various embodiments, functionality described as being performed by different modules may be combined and performed by one module, additional modules may be implemented, etc. As one example, word recognition module 140 may cooperate with facial analysis module 150 to improve detection of key words by lip reading.

As used herein, the term "module" refers to physical non-transitory computer readable media that stores information (e.g., program instructions) that instructs other circuitry (e.g., a processor) to perform specified operations or to circuitry configured to perform specified operations. Thus, the term encompasses a hardwired circuit or a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Exemplary Data from Analyzed Recordings

FIG. 3 is a diagram illustrating exemplary data for a particular word set. In the illustrated embodiment, four tables maintain data for a set of words. In various embodiments, the system of FIG. 1 is configured to process data structures that are configured to store the illustrated types of information.

Table 1, in the illustrated embodiment, specifies the exemplary set of words. In the illustrated embodiment, the words include Java, JSP, and SOAP. An identifier and a value (e.g., a string that specifies the word) may be maintained in a data structure for each word. Audio attributes of each word may also be stored in the data structure, e.g., to facilitate recognition of the word in processed audio. The data structure for the set of words may include its own identifier and may store the identifiers of each word in the set.

Table 2, in the illustrated embodiment, specifies statistics for words in the set for four recordings 1-4. A data structure for each recording may store an identifier of the recording, a link or pointer to the recording, a type of the recording, one or more dates associated with the recording (e.g., creation, update, etc.), and one or more entities associated with the recording, for example. In the illustrated embodiment, the second column of Table 2 indicates the number of recognized words for each recording (note that this may include words from other sets in addition to the set of words in Table 1). The third column of Table 2 indicates the count of words in set A for each recording. The fourth column of Table 2 indicates the percentage of words for set A among the recognized words. For example, recording 1 had eight recognized words, four of which were in set A, for a percentage of 50%. In some embodiments, the count and/or percentage may be used for ranking recordings. In some embodiments, information similar to Table 2 is maintained for each set of words when there are multiple sets.

Table 3, in the illustrated embodiment, specifies attributes for words in the set for recordings 1-4. The second column, in the illustrated embodiment, indicates the number of identified attributes for recognized words in each recording. The third column, in the illustrated embodiment, specifies which attribute was most common for set A (similar information may be maintained for each set of words). The fourth column, in the illustrated embodiment, specifies the percentage of the most common attribute in all the identified attributes. For example, five attributes were identified for recording 1 and half of them were attribute 1.

In some embodiments, each identified attribute for a given set of words may be used to weight counts for that set of words. In other embodiments, only the most common attribute for that word (or a set of multiple common attributes) may be used to weight counts for that set of words.

Table 4, in the illustrated embodiment, specifies weighted counts for each recording for set of words A. Note that, in the illustrated embodiment, the weighted counts for recordings 1 and 2 are higher than the actual counts while the weighted counts for recordings 3 and 4 are lower than the actual counts. This may be based on attribute 1 being more desirable than attributes 3 and 4, for example. The importance of different attributes may be static or may be based at least in part on user input (e.g., in a search query that specifies relative importance of different attributes). Any of the various statistics shown in FIG. 3 or discussed herein may be used as inputs to determine the weighted counts of Table 4, in various embodiments.

In the illustrated example, if only the most common attribute for each set is used for weighting, the weights would be 1.1 for attributes 1 and 2, 0.87 for attribute 3, and 0.53 for attribute 5 (assuming the weights are multiplied by the count for set A for each recording, e.g., as shown in Table 2). These weights may be statically defined for each attribute or may be variable. In variable embodiments, the weights may be dynamically updated in real time, e.g., based on user feedback. In some embodiments, similar weights for multiple attributes may be applied to one or more counts. In some embodiments, one or more weights may be applied directly to each count of a word, e.g., before it is added to a running count for a set of words for a recording. As another example, if attribute 3 is more desirable than attributes 1, 2, and 4, then the weight for attribute 4 might be 1 and the weight for the other attributes 0.8, and so on.

Note that, in some embodiments, the average count value is considered for each recording rather than the overall count value. For example, if the weighted count for set A is 4.4 for recording 1, the average count value per occurrence of words in set A for recording 1 is 1.1 (4.4/4). These embodiments may be most useful when multiple attributes are considered for each set of words (e.g., rather than only the most common attribute as discussed above). This may be useful in embodiments that do not use negative weights, in particular, to identify recordings that are below a threshold average count value (e.g., that are worse than average).

In the illustrated example, a binary determination of whether an attribute is detected or not is used. In other embodiments, a confidence level for each attribute may be determined and used for weighting based on the attribute. For example, if words in a given set are counted five times, and there is 100% confidence that a desirable attribute was detected for each occurrence, the weighted count might be ten, while the weighted count might be a value between five and ten if the same attribute was detected for each occurrence, but with a lower confidence level.

In some embodiments, each count is multiplied by a weighting factor. In some embodiments, a positive or negative weight is added to each count. In other embodiments, positive weights are used for each count, but weights below a threshold value indicate a lower than normal count. For example, on a scale from 0 to 5, weights below 2.5 may be used for attributes with negative connotations and weights above 2.5 for attributes with positive connotations. In other embodiments, any of various algorithms may be implemented to adjust counts of recognized words based on corresponding video and/or audio analysis.

In some embodiments, a data structure may be maintained for each entity that indicates an identifier for the entity and one or more attributes of the entity (e.g., words associated with the entity). In some embodiments, an overall rank data structure is maintained for a user based on their attributes. In some embodiments, manually entered attributes for a user may be used to generate sets of words for analysis of the user's recordings. In some embodiments, a data structure is configured to store count scores for a given user and recording.

The exemplary data and data structures discussed with reference to FIG. 3 are shown for purposes of illustration and may provide an efficient storage structure for the processing discussed with reference to FIG. 1. These examples are not intended to limit the scope of the present disclosure, however. In other embodiments, any of various data structures may be implemented, for example.

Exemplary Communications

Figure 4:
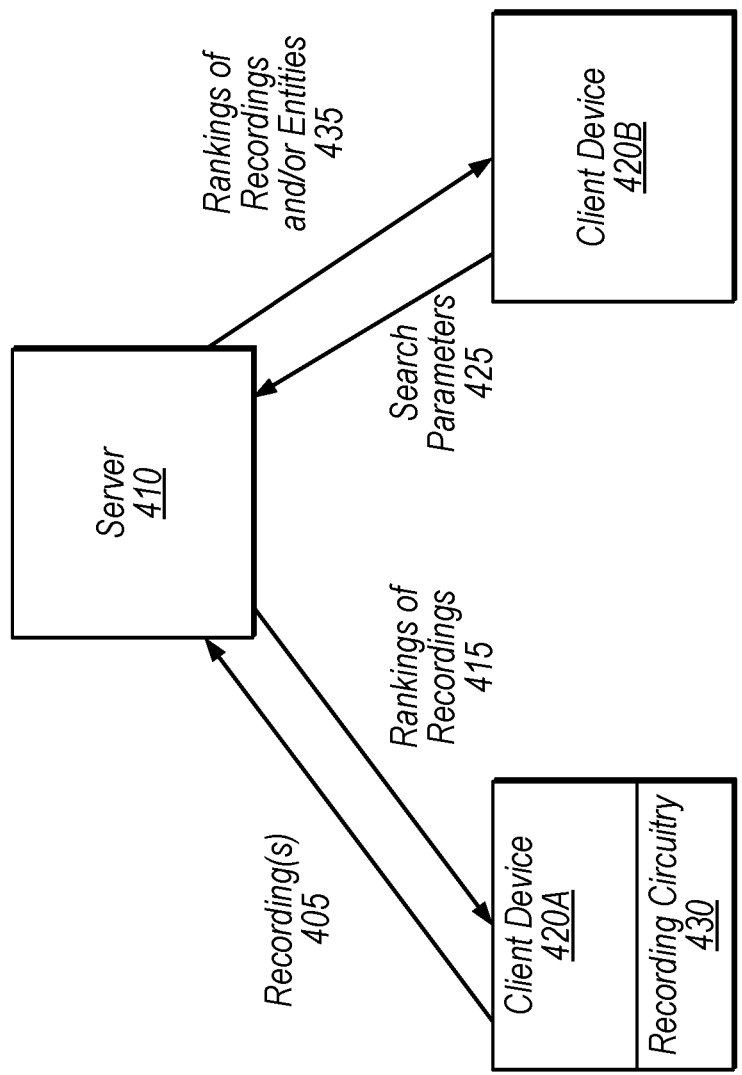
FIG. 4 is a diagram illustrating exemplary communications between a server and one or more client devices, according to some embodiments.

FIG. 4 is a block diagram illustrating exemplary communications between a server and one or more client devices, according to some embodiments. In some embodiments, server 410 is configured to implement the system of FIG. 1. In the illustrated embodiment, server 410 is configured to communicate with a number of client devices, including client device 420A and client device 420B.

Client device 420A, in the illustrated embodiment, includes recording circuitry 430 and is configured to generate and transmit one or more recordings 405 to server 410.

Server 410 may then analyze the recordings and return a ranking of the recordings 415 to device 420A. In some embodiments, one or more filters may be applied to the ranking process. For example, a job candidate may upload multiple videos and the ranking 415 may indicate which video has characteristics of candidates that are often hired. In filtered modes or implementations, the ranking 415 may indicate which video is most relevant to a particular employer or job posting, for example.

Client device 420B, in the illustrated embodiment, is configured to transmit search parameters 425 to server 410 and receive rankings of recordings and/or entities 435. For example, client device 420B may be accessed by an employer who wants to know the best candidates and/or uploaded recordings for a particular job posting. The search parameters may correspond to the job posting or may be manually entered, for example.

The job search context is used herein as an exemplary context for the disclosed techniques, but is not intended to limit the scope of the present disclosure. The disclosed techniques may be advantageously utilized in various other contexts. Speaking generally, the disclosed techniques may allow decrease the processing time needed for a computing system to perform selection of recordings and/or entities and may increase the relevancy of selected results. In particular, performing facial recognition analysis that is focused on intervals around recognized keywords may reduce facial recognition processing while still providing accurate results.

Exemplary Method

Figure 5:
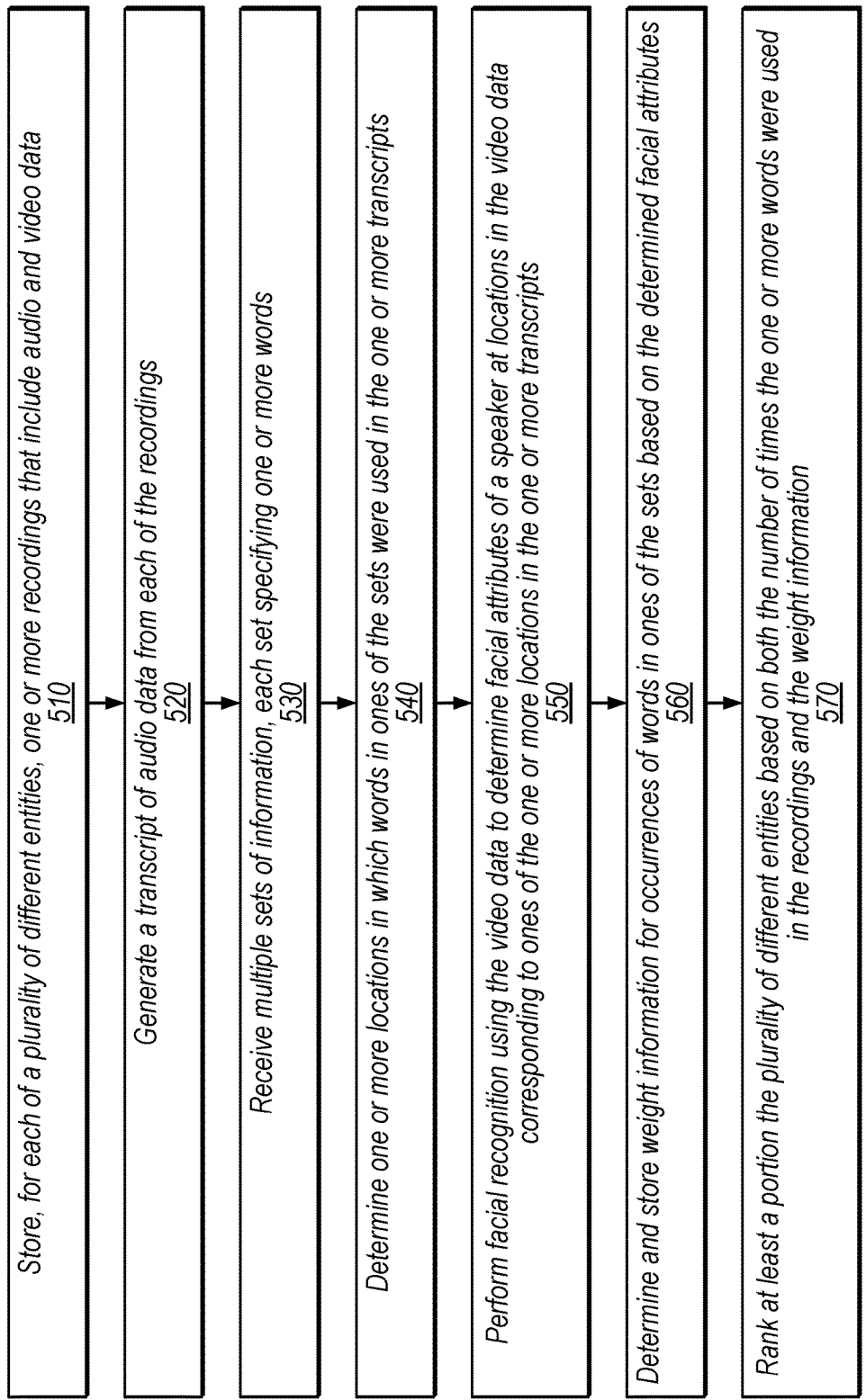
FIG. 5 is a flow diagram illustrating an exemplary method, according to some embodiments.

FIG. 5 is a flow diagram illustrating a method for ranking different entities based on processing corresponding recordings, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, a computing system stores, for each of a plurality of different entities one or more recordings that include audio and video data. The recordings may be uploaded to a server via the Internet, for example. Some entities may have multiple corresponding recordings while other entities may have a single corresponding recording. In some embodiments, stored metadata indicates the entity or entities associated with each recording.

At 520, in the illustrated embodiment, the system generates a transcript of audio data for each of the recordings. Various voice recognition techniques may be used to generate the transcript, including without limitation: hidden Markov models, dynamic time warping, neural networks, end-to-end modeling, linear discriminant analysis, etc. In some embodiments, additional information may be considered in generating the transcript, such as video data (e.g., for lip reading) or sets of words 115 (e.g., to provide knowledge of particularly important words that may be spoken) to supplement the audio content.

At 530, in the illustrated embodiment, the system receives multiple sets of information (e.g., information 115) where each set specifies one or more words. The words may be key words that will be counted to select and/or rank recordings. The words may be based on user input (e.g., filter parameters), pre-determined key words, other information associated with an entity such as a profile or resume, etc.

At 540, in the illustrated embodiment, the system determines one or more locations in which words in ones of the sets were used in the one or more transcripts. This information may be specified in one of various formats, such as a particular amount of time from a beginning of a recording, a time of day, etc.

At 550, in the illustrated embodiment, the system performs facial recognition using the video data to determine facial attributes of a speaker at locations in the video data corresponding to ones of the one or more locations in the one or more transcripts. FIG. 2, discussed above, provides examples of processing intervals around recognized words. If multiple individuals are shown in a video, this may include determining attributes of a user who is determined to be speaking at the location in the recording. Note that "facial recognition," as used herein, involves detecting a face of a speaker and determining attributes of the face. This term, as used herein, does not require recognition of a particular known user. Rather, the disclosed techniques may be used for various users whose facial characteristics are unknown. Facial recognition analysis may include, without limitation: neural network analysis, Bayesian networks, emotion detection, three-dimensional analysis, texture analysis, etc. Determined attributes may include, without limitation: emotions, truthfulness, stress, perceived character qualities, social tendencies, etc.

At 560, in the illustrated embodiment, the system determines and stores weight information for occurrences of words in ones of the sets based on the determined facial attributes. In some embodiments, a pre-determined set of attributes is defined and the facial recognition processing indicates which of the attributes is detected during the processing intervals. Each attribute may have a corresponding weight value that is applied to a count when the attribute is detected. In some embodiments, a confidence value may be used to adjust the weight (e.g., to have more influence if confidence that the attribute was detected is higher than if confidence that the attribute was detected is relatively lower). In some embodiments, multiple levels of an attribute may be used, e.g., to determine if a user is "very excited," "excited," or "slightly excited" when speaking a word. Different levels of an attribute may be used to adjust the corresponding weight similarly to the confidence value described above. The weights may be applied to each count or to aggregated count values. Each detected utterance of a word may be weighted based on multiple attributes, in some embodiments. In other embodiments, a detect utterance is weighted based on a single attribute, e.g., the attribute most strongly detected.

In some embodiments, a user is able to adjust the importance of certain key words and/or facial attributes. For example, a query may allow a user to specify multiple sets of words but also indicate that a certain set of words is highest priority and the system may weight counts of words in that set more highly. As another example, a query may allow a user to specify that certain facial attributes are considered higher priority and the system may use larger weights for those attributes relative to a default weight and/or relative to other attributes.

At 570, in the illustrated embodiment, the system ranks at least a portion of the plurality of different entities. The system may select only a portion of the entities for ranking (e.g., entities with a threshold score). In the illustrated embodiment, the ranking is based on both the number of times the one or more words were used in the recordings and the weight information. For example, certain recordings with lower counts of key words may be ranked higher if the determined weights are higher based on detected attributes. The system may cause results of the ranking to be displayed, in various embodiments. In some embodiments, the system may adjust the ranking technique based on user feedback. For example, the system may adjust weights, adjust an algorithm used to apply weights, etc. in response to user feedback indicating that relevant results were or were not selected.

In some embodiments, different sets of key words may have different weights. For example, counts for a primary set of keywords may be weighted more heavily than counts for one or more secondary sets of keywords, in some embodiments.

In some embodiments, additional weights may be input to the various ranking operations described herein. For example, overall attributes from an entire recording may be used to weight counts, in addition to the specific facial attributes corresponding to detected words. Consider, for example, a user who is very excited each time they speak a key word but is angry throughout the rest of a recording. Considering the overall attribute may cause such a user to be scored lower than they would have been scored without considering the overall attribute. Examples of attributes that may be considered based on larger portions of a recording may include: language style, social qualities, emotions based on voice analysis, etc.

In some embodiments, a method may begin with method elements 510-560 of FIG. 5, followed by ranking at least a portion of the plurality of recordings based on both the number of times the one or more words were used in the recordings and the weight information. This may include ranking recordings associated with a particular entity, for example, to indicate to that entity which recordings will be scored higher. This may allow an entity to improve scores in future recordings, for example, by emulating aspects of recordings that are ranked higher.

In some embodiments, the system is configured to indicate one or more reasons for ranking certain entities or recordings more highly. For example, the system may identify the number of times a particular key word was detected, certain positive or negative determined facial attributes associated with particular key words, etc. For example, if a user determines that a recording describing his Java coding skills was associated with an attribute that indicates lack of confidence, that user may be able to improve competence in Java programming and upload a new recording with more confidence. In other embodiments, the ranking may be transparent to the user.

In some embodiments, various techniques disclosed herein may be implemented by executing program instructions stored on one or more non-transitory computer-readable media on one or more processing elements.

Exemplary Device

Figure 6:
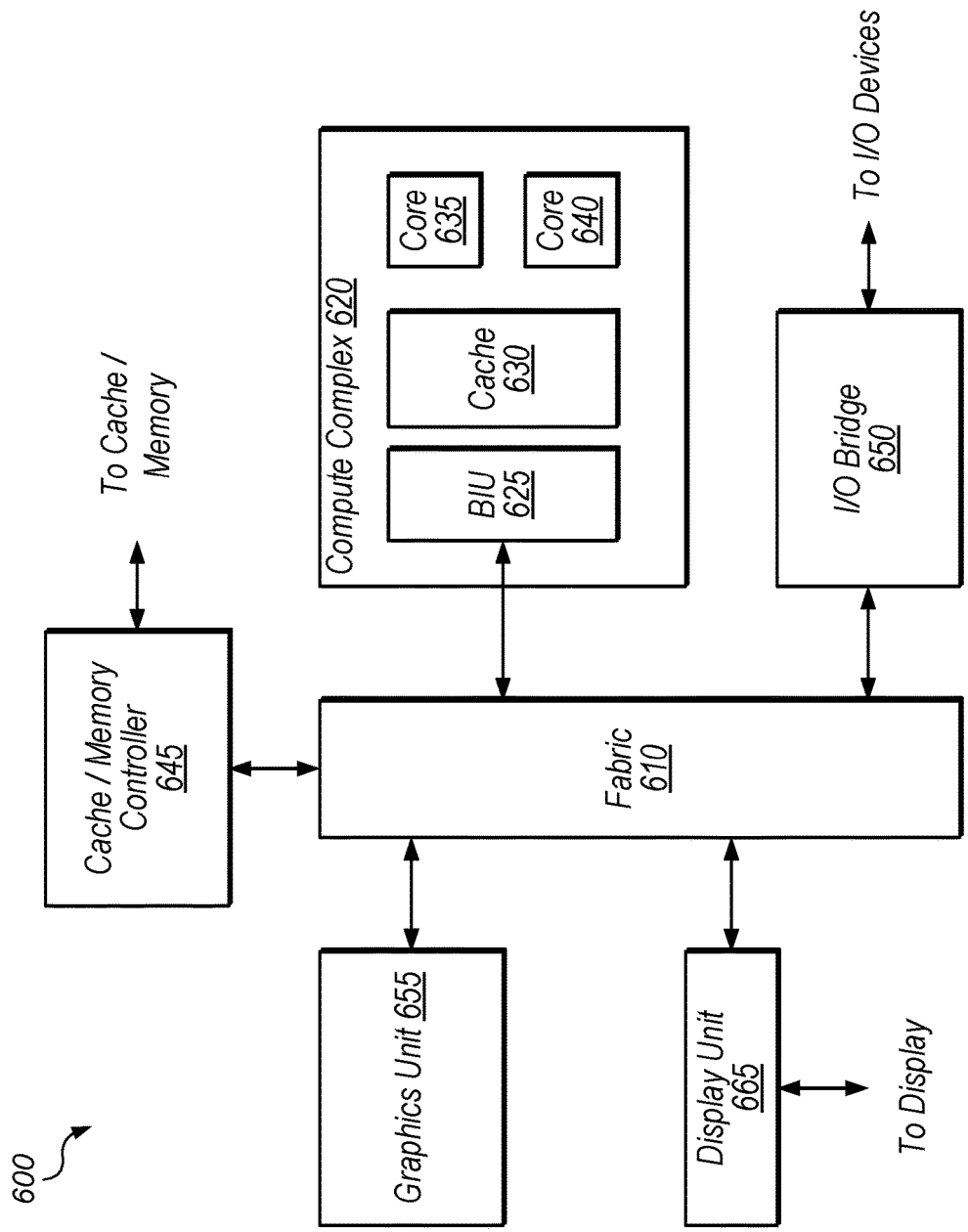
FIG. 6 is a block diagram illustrating an exemplary computing device, according to some embodiments.

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620, input/output (I/O) bridge 650, cache/memory controller 645, graphics unit 655, and display unit 665.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 655 may be described as "coupled to" a memory through fabric 610 and cache/memory controller 645. In contrast, in the illustrated embodiment of FIG. 6, graphics unit 655 is "directly coupled" to fabric 610 because there are no intervening elements.

Graphics unit 655 may include one or more processors and/or one or more graphics processing units (GPU's). Graphics unit 655 may receive graphics-oriented instructions, such as OPENGL®, Metal, or DIRECT3D® instructions, for example. Graphics unit 655 may execute specialized GPU instructions or perform other operations based on the received graphics-oriented instructions. Graphics unit 655 may generally be configured to process large blocks of data in parallel and may build images in a frame buffer for output to a display. Graphics unit 655 may include transform, lighting, triangle, and/or rendering engines in one or more graphics processing pipelines. Graphics unit 655 may output pixel information for display images.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
one or more processors; and
one or more memories having program instructions stored thereon that are executable by the one or more processors to:
store for each of a plurality of different entities, one or more recordings that include audio and video data;
generate a transcript of audio data from each of the recordings;
receive multiple sets of information, each set specifying one or more words;
determine one or more locations in which words in ones of the sets were used in the one or more transcripts;
perform facial recognition using the video data to determine facial attributes of a speaker at different times in the video data corresponding to ones of the one or more locations in the one or more transcripts;
determine and store weight information for occurrences of words in ones of the sets based on the determined facial attributes; and
rank at least a portion of the plurality of different entities based on both the number of times the one or more words were used in the recordings and the weight information.

2. The apparatus of claim 1, wherein the instructions are further executable to: rank at least a portion of the recordings based on both the number of times the one or more words were used in the recordings and the weight information.

3. The apparatus of claim 2, wherein the portion of the recordings corresponds to recordings of a particular one of the entities.

4. The apparatus of claim 1, wherein the weight information includes negative weights for one or more first facial attributes and positive weights for one or more second facial attributes.

5. The apparatus of claim 1, wherein the weight information includes factors less than one for one or more first facial attributes and factors greater than one for one or more second facial attributes.

6. The apparatus of claim 1, wherein the weight information is applied to each occurrence of a word in one of the sets based on one or more detected facial attributes at the time the word was spoken.

7. The apparatus of claim 1, wherein the weight information is applied to an overall count for one of the sets based on multiple detected attributes for words in the set.

8. The apparatus of claim 1, wherein the ranking is further based on facial recognition of respective entireties of ones of the recordings to determine overall attributes of the ones of the recordings.

9. The apparatus of claim 1, wherein the program instructions are further executable to dynamically update the stored weight information based on user feedback.

10. A method, comprising:
storing, by a computing system, for each of a plurality of different entities, one or more recordings that include audio and video data;
generating, by the computing system, a transcript of audio data from each of the recordings;
receiving, by the computing system, multiple sets of information, each set specifying one or more words;
determining, by the computing system, one or more locations in which words in ones of the sets were used in the one or more transcripts;
performing, by the computing system, facial recognition using the video data to determine facial attributes of a speaker at different times in the video data corresponding to ones of the one or more locations in the one or more transcripts;
determining and storing, by the computing system, weight information for occurrences of words in ones of the sets based on the determined facial attributes; and
ranking, by the computing system, at least a portion of the plurality of different entities based on both the number of times the one or more words were used in the recordings and the weight information.

11. The method of claim 10, further comprising: ranking, by the computing system, at least a portion of the recordings based on both the number of times the one or more words were used in the recordings and the weight information.

12. The method of claim 11, wherein the portion of the recordings corresponds to recordings of a particular one of the entities.

13. The method of claim 10, wherein the weight information is applied to each occurrence of a word in one of the sets based on one or more detected facial attributes at the time the word was spoken.

14. The method of claim 10, wherein the weight information is applied to an overall count for one of the sets based on multiple detected attributes for words in the set.

15. The method of claim 10, wherein the ranking is further based on audio attributes determined for ones of the recordings.

16. The method of claim 10, wherein the facial recognition is performed during a time interval lasting between two and five seconds corresponding to ones of the locations.

17. A non-transitory computer-readable medium having instructions stored thereon that are executable by a computing device to perform operations comprising:
store for each of a plurality of different entities, one or more recordings that include audio and video data;
generate a transcript of audio data from each of the recordings;
receive multiple sets of information, each set specifying one or more words;

determine one or more locations in which words in ones of the sets were used in the one or more transcripts;

perform facial recognition using the video data to determine facial attributes of a speaker at different times in the video data corresponding to ones of the one or more locations in the one or more transcripts;

determine and store weight information for occurrences of words in ones of the sets based on the determined facial attributes; and rank at least a portion of the plurality of different entities based on both the number of times the one or more words were used in the recordings and the weight information.

18. The non-transitory computer-readable medium of claim 17, wherein the instructions are further executable to: rank at least a portion of the recordings based on both the number of times the one or more words were used in the recordings and the weight information.

19. The non-transitory computer-readable medium of claim 17, wherein the weight information includes negative weights for one or more first facial attributes and positive weights for one or more second facial attributes.

20. The non-transitory computer-readable medium of claim 17, wherein the weight information is applied to each occurrence of a word in one of the sets based on one or more detected facial attributes at the time the word was spoken.

* * * * *